United States Patent
Tang et al.

(10) Patent No.: US 8,359,558 B2
(45) Date of Patent: Jan. 22, 2013

(54) MODELING OF CELL DELAY CHANGE FOR ELECTRONIC DESIGN AUTOMATION

(75) Inventors: Qian-Ying Tang, Sunnyvale, CA (US); Qiang Chen, Cupertino, CA (US); Sridhar Tirumala, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 251 days.

(21) Appl. No.: 12/724,955

(22) Filed: Mar. 16, 2010

(65) Prior Publication Data

US 2011/0231811 A1   Sep. 22, 2011

(51) Int. Cl.
*G06F 17/50* (2006.01)

(52) U.S. Cl. ........ 716/106; 716/100; 716/108; 716/113; 716/122; 716/132; 716/133; 716/134; 716/136; 716/139

(58) Field of Classification Search ................... 716/100, 716/108, 113, 122, 132, 133, 134, 136, 139, 716/106

See application file for complete search history.

(56) References Cited

U.S. PATENT DOCUMENTS

| | | | |
|---|---|---|---|
| 4,551,779 A * | 11/1985 | Murakami et al. ............... 361/86 |
| 4,724,342 A * | 2/1988 | Sato et al. ...................... 326/117 |
| 5,666,288 A | 9/1997 | Jones et al. |
| 6,038,384 A | 3/2000 | Ehrler |
| 6,205,570 B1 * | 3/2001 | Yamashita ..................... 716/113 |
| 6,209,122 B1 * | 3/2001 | Jyu et al. ....................... 716/113 |
| 6,578,176 B1 * | 6/2003 | Wang et al. .................... 716/133 |
| 6,609,189 B1 * | 8/2003 | Kuszmaul et al. .............. 712/23 |
| 6,732,341 B1 | 5/2004 | Chang et al. |
| 7,032,194 B1 | 4/2006 | Hsueh et al. |
| 7,069,525 B2 * | 6/2006 | Bhushan et al. ............... 716/136 |
| 7,155,689 B2 * | 12/2006 | Pierrat et al. .................... 716/52 |
| 7,356,795 B2 * | 4/2008 | Yamauchi ....................... 716/52 |
| 7,441,211 B1 * | 10/2008 | Gupta et al. ................... 716/133 |
| 7,586,299 B2 * | 9/2009 | Fujiyama et al. .............. 323/350 |
| 7,644,378 B2 * | 1/2010 | Wang et al. .................... 716/132 |
| 7,721,236 B2 * | 5/2010 | Hwang et al. .................. 716/113 |
| 7,735,034 B2 * | 6/2010 | Miura et al. ................... 716/136 |
| 7,793,244 B2 * | 9/2010 | Kimata et al. ................. 716/113 |
| 7,913,200 B2 * | 3/2011 | Levy ............................. 716/100 |
| 8,245,165 B1 * | 8/2012 | Tiwary et al. ................. 716/108 |
| 2001/0018758 A1 | 8/2001 | Tanaka et al. |

(Continued)

OTHER PUBLICATIONS

Wroblewski et al.; "Automated transistor sizing algorithm for minimizing spurious switching activities in CMOS circuits"; Publication Year: 2000; Circuits and Systems, 2000. Proceedings. ISCAS 2000 Geneva. The 2000 IEEE International Symposium on; vol. 3; pp. 291-294; vol. 3.*

(Continued)

*Primary Examiner* — Helen Rossoshek
(74) *Attorney, Agent, or Firm* — Haynes Beffel & Wolfeld LLP

(57) ABSTRACT

An integrated circuit design optimization procedure to modify a cell feature, such as gate length, models changes in delay as a result of the modification. In the delay change calculation, a characteristic of an event in cell switching behavior, such as the output short-circuit voltage $V_{SC}$, is determined for the modified cell, where changes in the determined characteristic correlate with changes in delay of the cell due to the modification. Next, a value for delay of the modified cell is determined as a function of the determined characteristic of the event. The procedure can be applied after placement and routing. A timing-constrained, leakage power reduction is described using the delay change model.

26 Claims, 11 Drawing Sheets

U.S. PATENT DOCUMENTS

| | | | |
|---|---|---|---|
| 2005/0278658 A1 | 12/2005 | Zhang et al. | |
| 2006/0110837 A1 | 5/2006 | Gupta et al. | |
| 2006/0150132 A1 | 7/2006 | Gupta | |
| 2007/0010981 A1* | 1/2007 | Ding et al. | 703/14 |
| 2007/0033558 A1 | 2/2007 | Nakagawa et al. | |
| 2007/0099314 A1 | 5/2007 | Chen et al. | |
| 2007/0106966 A1 | 5/2007 | Inoue et al. | |
| 2007/0168898 A1 | 7/2007 | Gupta et al. | |
| 2009/0276075 A1* | 11/2009 | Good et al. | 700/110 |
| 2010/0100347 A1* | 4/2010 | Buehler et al. | 702/79 |
| 2010/0269079 A1* | 10/2010 | Banerjee et al. | 716/5 |
| 2010/0281448 A1* | 11/2010 | He | 716/6 |
| 2010/0283051 A1* | 11/2010 | Mayor | 257/48 |

OTHER PUBLICATIONS

Cao et al. Mapping Statistical Process Variations Toward Circuit Performance Variability: An Analytical Modeling Approach; Publication Year: 2007;Computer-Aided Design of Integrated Circuits and Systems, IEEE Transactions on; vol. 26 , Issue: 10; pp. 1866-1873.*

Hirata et al.; "Estimation of propagation delay considering short-circuit current for static CMOS gates"; Publication Year: 1998; Circuits and Systems I: Fundamental Theory and Applications, IEEE Transactions on; vol. 45 , Issue: 11 pp. 1194-1198.*

International Search Report mailed Oct. 4, 2011 in PCT/US2011/028613.

Basu, Shubhankar, et al., "Variation Aware Spline Center and Range Modeling for Analog Circuit Performance," 9th Int'l Symp. on Quality Electronic Design, Mar. 17-19, 2008 pp. 162-167.

Bisdounis, L, et al., "Switching Response Modeling of the CMOS Inverter for Sub-micron Devices," Proc. Design, Automation and Test in Europe, Feb. 23-26, 1998, pp. 729-735.

Borkar et al., "Parameter variations and impact on circuits and microarchitecture" Proceeding of the Design Automation Conference, Jun. 2-6, 2003.

Clark et al., "Managing Standby and Active Mode Leakage Power in Deep Sub-micron Design," ISLPED 2004, Proceedings of the 2004 International Symposium on Low Power Electronics and Design, Aug. 9-11, 2004.

Daga, Jean Michel, et al., "A Comprehensive Delay Macro Modeling for Submicrometer CMOS Logics," IEEE J. of Solid-State Circuits, vol. 34, No. 1, Jan. 1999, 14 pages.

Dutta, Santanu, et al., "A Comprehensive Delay Model for CMOS Inverters," IEEE J. of Solid-State Circuits, vol. 30, No. 8, Aug. 1995, 8 pages.

Forzan, Cristiano, et al. "Accurate and Efficient Macromodel of Submicron Digital Standard Cells," Proceedings of the 34th Design Automation Conference, Jun. 9-13, 1997, pp. 633-637.

Gupta, Puneet et al., "Selective Gate-Length Biasing for Cost-Effective Runtime Leakage Control," Proceedings. 41st Design Automation Conference, Jun. 7-11, 2004, pp. 327-330.

Gupta, Puneet, et al., "Gate-Length Biasing for Runtime-Leakage Control," IEEE Trans. on Computer-Aided Design of Integrated Circuits and Systems, vol. 25, No. 8, Aug. 2006, 11 pages.

Harish, B.P., et al., "On a Generalized Framework for Modeling the Effects of Process Variations on Circuit Delay Performance Using Response Surface Methodology," IEEE Trans. on Computer-Aided Design of Integrated Circuits and Systems, vol. 26, No. 3, Mar. 2007, 9 pages.

Maurine, P., et al., "Transition Time Modeling in Deep Submicron CMOS," IEEE Trans. on Computer-Aided Design of Integrated Circuits and Systems, vol. 21, No. 11, Nov. 2002, 12 pages.

Na, M.H., et al., "The Effective Drive Current in CMOS Inverters," IEEE IEDM Dec. 8-11, 2002, pp. 121-124.

Rudell, Richard, "Tutorial: Design of a Logic Synthesis System," Proc. of the 33rd Annual Conf. on Design Automation, Jun. 3-7, 1996, pp. 191-196.

Sakurai, Takayasu, et al., "A Simple Short-Channel MOSFET Model and Its Application to Delay Analysis of Inverters and Series-Connected MOSFETs," IEEE Int'l Symp. on Circuits and Systems, vol. 1, May 1-3, 1990, pp. 105-108.

Shah, Saumil, et al., "Standard Cell Library Optimization for Leakage Reduction," 43rd ACM/IEEE Design Automation Conference, Jul. 24-28, 2006, pp. 983-986.

Tang et al., "Phenomenological model for gate length bias dependent inverter delay change with emphasis on library characterization," ISQED 2009, Quality of Electronic Design, Mar. 16-18, 2009.

Trihy, Richard, "Addressing Library Creation Challenges from Recent Liberty Extensions," 45th Annual Design Automation Conference, Jun. 8-13, 2008, pp. 474-479.

Borkar, Shekhar, "Extending and Expanding Moore's Law—Challenges and Opportunities," Intel Corp., Apr. 11, 2006, slides 1-44.

Sirisantana et al., "High-Performance Low-Power CMOS Circuits Using Multiple Channel Length and Multiple Oxide Thickness," 2000 IEEE, pp. 227-232.

Wei et al., "Low Voltage Low Power CMOS Design Techniques for Deep Submicron ICs," pp. 1-6.

Cadence Design Systems, Inc. Datasheet, "Assura Parasitic Extraction," Oct. 2004, 5 pages.

E. Augendre et al., "Controlling STI-Related Parasitic Conduction in 90 nm CMOS," ESSDERC, Florence, Sep. 24-26, 2002, 20 pages.

Kannan, Lalgudi et al., "A Methodology and Algorithms for Post-Placement Delay Optimization," 31st ACM/IEEE Design Automation Conference, Jun. 6-10, 1994, 6 pages.

Mentor Graphics Datasheet, "Calibre xRC Parasitic Extraction" Dec. 2004, 5 pages.

Synopsys, Inc., Datasheet "IC Compiler The next-Generation Physical Design System," Sep. 2009, 6 pages.

Synopsys, Inc., Datasheet "PrimeTime Golden Timing Signoff Solution and Environment," Sep. 2009, 5 pages.

* cited by examiner

MODELING OF CELL DELAY CHANGE FOR ELECTRONIC DESIGN AUTOMATION

BACKGROUND

1. Field of the Invention

The present invention relates to electronic design automation (EDA), and to modeling delay changes arising for example from implementation of changes in cells of an integrated circuit design for performance optimization.

2. Description of Related Art

One approach to EDA supported design is based on the definition of an integrated circuit using a computer system as a netlist of circuit elements. Also, a cell library is provided that specifies characteristics of cells available for use in a physical implementation using a given technology of the circuit elements in the netlist. The entries in the library include layout data, performance data such as delay models and power models, and other supporting information. To implement the netlist, cells are selected from the library, placed in a layout space, and interconnections are defined among the cells. The selection of cells, placement of cells and defining interconnections among the cells can be referred to as placement and routing. The result of a place and route procedure is a layout file which specifies the shapes and locations of components of the cells, and the interconnections of the cells which are to be made into an integrated circuit.

The cell library has a finite number of choices for the circuit elements. Adding cells to the library is costly, as each cell in the library is prequalified for manufacturability and other factors.

Small layout changes, such as transistor gate length increases, can be used to optimize integrated circuits for performance, such as to reduce leakage power, etc. (See, Lawrence T. Clark et al., "Managing Standby and Active Mode Leakage Power in Deep Sub-micron Design," ISLPED 2004, Proceedings of the 2004 International Symposium on Low Power Electronics and Design, Aug. 9-11, 2004.

Transistors with above-nominal gate lengths have been proposed and used in VLSI designs to reduce the active mode leakage power (i.e., runtime leakage). See, Puneet Gupta et al. "Selective gate-length biasing for cost-effective runtime leakage control," Proceedings of the 41st Design Automation Conference, 2004 (Gupta 1); Shekhar Borkar et al., "Parameter variations and impact on circuits and microarchitecture" Proceeding of the Design Automation Conference, 2-6 Jun. 2003; Qian Ying Tang, et al. "Phenomenological model for gate length bias dependent inverter delay change with emphasis on library characterization," ISQED 2009, Quality of Electronic Design, 16-18 Mar. 2009; and Puneet Gupta et al., "Gate-length biasing for runtime-leakage control," IEEE Transactions on Computer-Aided Design of Integrated Circuits and Systems, vol. 25, Issue 8, August 2006 (Gupta 2).

Gate length biasing can be implemented either on the cell level or on the transistor level. See, Tang; Gupta 2; Saumil Shah, et al., "Standard cell library optimization for leakage reduction," Design Automation Conference, 2006 43rd ACM/IEEE; and Lawrence T. Clark et al., "Managing Standby and Active Mode Leakage Power in Deep Sub-micron Design," ISLPED 2004, Proceedings of the 2004 International Symposium on Low Power Electronics and Design, Aug. 9-11, 2004. The resulting lower-performance, lower-leakage standard cell variants are then exploited to replace as many cell instances as possible on design paths with positive timing slack (Gupta 2).

The values of the gate length bias are usually chosen to ensure footprint equivalence and complete interchangeability between cell masters (i.e. the initial form of the cell in the library entry) and cell variants (i.e., modified cells), and the number of allowable biases may vary. For example, the dual-gate-length (DGL) approach allows the nominal gate length and one bias only. The multi-gate-length (MGL) technique, however, can use many bias values with fine increments on the cell level. MGL, similar to the within-cell transistor-level biasing, results in finer levels of granularity in delay-leakage trade-off on the cell level. Intuitively, finer levels of granularity could translate into better leakage reduction on the design level, in part by moving timing paths closer to the guard-banded zero slack timing point. Previous studies, however, reported inconsistent findings, with some showing noticeable additional leakage reduction and others observing very little advantage by using finer levels of granularity.

So gate length changes and other small changes that affect cell performance such as voltage thresholds and leakage power can be made to optimize performance of a design after placement and routing using a standard cell library.

Procedures applied to optimize circuit designs using these techniques typically involve constrained optimization procedures, where the adjustments made are constrained by their effect on delay as constrained by available slack. Such procedures depend on the ability to compute the delay changes with reasonable computing resources, so that they can be accomplished without undue cost.

In practice, what is often more important during design optimization or physical implementation is to capture the variations in delay as a function of changes in cell/device parameters such as the gate length. While previous works have primarily focused on modeling the delay itself, they are relatively ineffective in capturing the changes in delay. Also, modeling for the purposes of library characterization can be prohibitively expensive using prior models because of the explosively huge number of cell variants that might be needed in a robust library to optimization processes.

It is desirable therefore to provide design automation tools for modeling delay changes due to modifications of cells to enable designers to apply constrained optimization procedures to implement such modifications.

SUMMARY

A modeling methodology and analytical model are described for use in integrated circuit design optimization, which includes a procedure for modeling delay changes due to modifications of a cell master, which can be applied along with the delay model for the cell master to estimate delays for modified cells.

A computer-implemented model is provided which enables a design optimization method for a target circuit design which is characterized by a machine readable file. The method includes executing a modification procedure to modify a characteristic of the cell, such as gate length, to produce a modified cell. Next, a characteristic of an event in cell switching behavior, such as the output short-circuit voltage $V_{SC}$ described in more detail below, is determined for the modified cell, where changes in the determined characteristic correlate with changes in delay of the cell due to the modification. Next, a value for delay of the modified cell is determined as a function of the determined characteristic of the event. The procedure described herein can be applied where the target circuit design includes a layout file produced after placement and routing, or in other stages of design in which information, such as input slew and output load, are available for use in determining delay of a master cell and a modified cell.

The circuit modification procedure in an embodiment described here comprises timing constrained, leakage power reduction, which can be achieved by gate length adjustments or other modifications to the target circuit design.

In embodiments described herein the event in cell switching behavior is a transition in cell switching behavior from a first region in which one behavior dominates the cell switching to a second region in which another behavior dominates the cell switching. For example, the first region can be a short-circuit behavior region including competing pull-up and pulldown current at the output. The second region can be a current flow region dominated by one of pull-up and pull-down currents at the output of the cell. The characteristic of such a transition event can be the value of the voltage $V_{SC}$, which is equal to an output voltage for the cell in the modified form, at a point in which the input voltage crosses outside a short-circuit behavior range. Thus, where the cell is an inverter, the transition event is a point at which the input voltage crosses from inside to outside a range between a threshold voltage $V_{dd}$-$V_{tp}$ beneath which a pull-up PMOS transistor is on, and a threshold voltage $V_{tn}$ above which a pull-down NMOS transistor is on.

In addition, a cell library, and a procedure for implementing a cell library, are described herein, where the cell library includes entries for a cell having parameters of a delay model for the cell in an initial form, and parameters of a model to estimate the characteristic (e.g. $V_{SC}$) of the event as a function of modifications of the initial form. In addition, the entry for the cell includes parameters of a delay change model to estimate the delay change relative to delay of the cell in the initial form as a function of the characteristic (e.g. $V_{SC}$).

A data processing system is described that is adapted for performing the processes outlined herein.

An article of manufacture is described which comprises a machine readable data storage medium storing instructions executable by a processor adapted for performing the processes outlined herein.

An article of manufacture is described which comprises a machine readable data storage medium storing a cell library, which is produced according to the processes described herein.

An article of manufacture is described which comprises a machine readable data storage medium storing a layout file in which shapes and locations of multiple layers of the cells selected for implementation, and of interconnect structures for connecting the cells, are specified for the lithographic masks and integrated circuit structures to be manufactured are defined, and which is produced according to the processes described herein.

Other aspects and advantages can be seen on review of the drawings, the detailed description and the claims, which follow.

DETAILED DESCRIPTION

A detailed description of embodiments of the present invention is provided with reference to the FIGS. 1-15.

A phenomenological model derived from device equations with empirical fitting parameters to model percentage changes in delay as a result of gate length bias is described. The model can be extended to any type of cell modification, such as threshold voltage doping, gate shape changes, cell width changes, and so on, that can be used for optimizations constrained by delay. The model focuses on capturing the percentage delay change as a function of gate length change or other change (i.e., bias) over wide, practical ranges of input slews and output capacitances that are typically used in library characterization. The model can be derived based on physical device equations with empirical fitting parameters for improved accuracy. A physically based parameter is introduced that can be determined efficiently based on cell modifications and that correlates with delay changes caused by the modifications, such as $V_{SC}$ that represents the output voltage value at the end of the short circuit region as explained in more detail below.

This model can be used in the inner loop of circuit optimization engines for leakage/delay co-optimization, as well as in characterization tools for selecting optimal gate length bias when designing cell variant libraries for leakage minimization.

Figure 1:
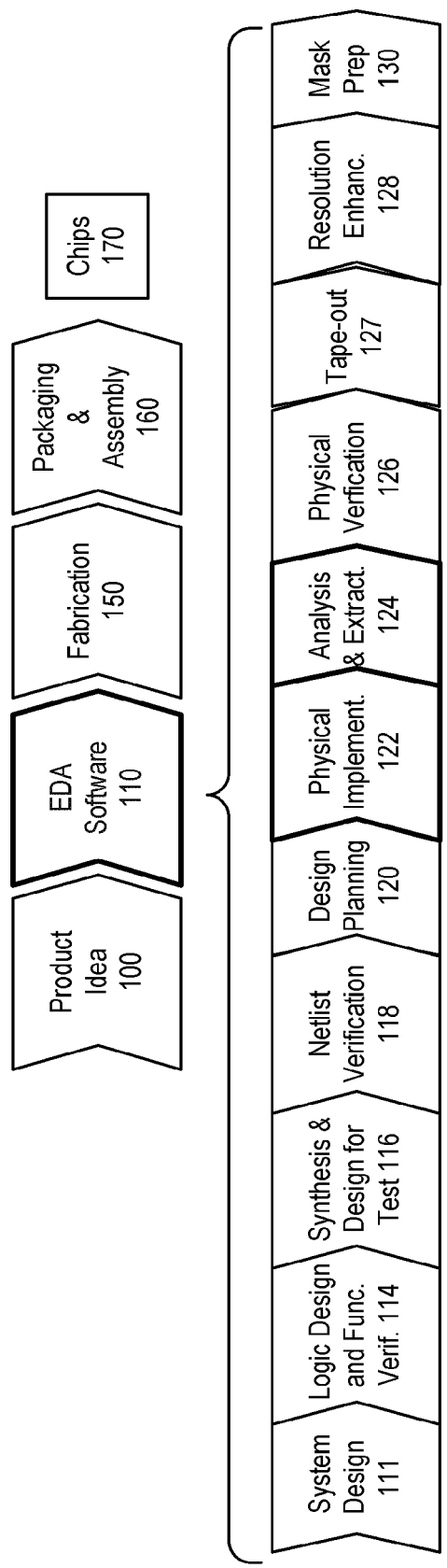
FIG. 1 is a simplified representation of an illustrative integrated circuit design flow, in which delay change computations due to modification of cells, such as after place and route operations, can be employed.

FIG. 1 is a simplified representation of an illustrative integrated circuit design flow. As with all flowcharts herein, it will be appreciated that many of the steps of FIG. 1 can be combined, performed in parallel or performed in a different sequence without affecting the functions achieved. In some cases a rearrangement of steps will achieve the same results only if certain other changes are made as well, and in other cases a rearrangement of steps will achieve the same results only if certain conditions are satisfied. Such rearrangement possibilities will be apparent to the reader.

At a high level, the process of FIG. 1 starts with the product idea (block 100) and is realized in an EDA (Electronic Design Automation) software design process (block 110). When the design is finalized, the fabrication process (block 150) and packaging and assembly processes (block 160) occur, ultimately resulting in finished integrated circuit chips (result 170).

The EDA software design process (block 110) is composed of a number of steps 111-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (block 110) will now be provided.

System design (block 111): The designers describe the functionality that they want to implement, they can perform what-if planning to refine functionality, check costs, etc. Hardware-software architecture can occur at this stage. Example EDA software products from Synopsys, Inc. that can be used at this step include Model Architect, Saber, System Studio, and DesignWare® products.

Logic design and functional verification (block 114): At this stage, high level description language (HDL) code, such as the VHDL or Verilog code, for modules in the system is written and the design is checked for functional accuracy. More specifically, the design is checked to ensure that it produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (block 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Complier, FPGA Compiler, TetraMAX, and DesignWare® products.

Netlist verification (block 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (block 120): Here, an overall floor plan for the chip is constructed and analyzed for timing and top-level routing. Example EDA software products from Synopsys, Inc. that can be used at this step include Astro and IC Compiler products.

Physical implementation (block 122): The placement (positioning of circuit elements) and routing (connection of the same) occurs at this step. Example EDA software products from Synopsys, Inc. that can be used at this step include IC Compiler, AstroRail, Primetime, and Star RC/XT products.

The delay change computation for cell modifications, such as modifications made using procedures for constrained circuit optimization, and the analysis technologies described herein can be implemented at this stage of the process, and can be provided as a function in or supporting IC Compiler for example.

Analysis and extraction (block 124): At this step, the circuit function is verified at a transistor level, this in turn permits what-if refinement. Example EDA software products from Synopsys, Inc. that can be used at this stage include AstroRail, PrimeRail, Primetime, and Star RC/XT products. The modification procedures for constrained circuit optimization and analysis technologies described herein can utilize results of the process.

Physical verification (block 126): At this stage various checking functions are performed to ensure correctness for: manufacturing, electrical issues, lithographic issues, and circuitry. Example EDA software products from Synopsys, Inc. that can be used at this stage include the Hercules product.

Tape-out (block 127): This stage provides the "tape-out" data for production of masks for lithographic use to produce finished chips. Example EDA software products from Synopsys, Inc. that can be used at this stage include the CATS(R) family of products.

Resolution enhancement (block 128): This stage involves geometric manipulations of the layout to improve manufacturability of the design. Example EDA software products from Synopsys, Inc. that can be used at this stage include Proteus/Progen, ProteusAF, and PSMGen products.

Mask preparation (block 130): This stage includes both mask data preparation and the writing of the masks themselves. Example EDA software products from Synopsys, Inc. that can be used at this stage include CATS(R) family of products.

Another process involved in EDA, not shown in FIG. 1, includes characterization of the cells that can be implemented using a target technology, to create a cell library utilized for placement and routing functions during physical implementation. A standard cell library can include a collection of entries that can be fabricated using a manufacturing line, including characterizing data for cells defining low level logic functions such as NAND, AND, NOR, OR, INVERT, flip-flops, latches and buffers involving relatively small numbers of transistors. The cells are typically optimized, full custom layouts for a specific implementing technology, which minimizes delays and area. A typical standard cell library contains layout data, functional definitions, delay information, power information and noise information for each cell. The entries for the cells in the library can include other information, such as SPICE models of the cells, high level description language models, parasitic extraction models and design rule checking decks.

A cell library includes a plurality of entries, where the entries in the cell library include parameters of a delay model for the corresponding cell in an initial form of the cell (i.e. cell master), from which delay values for the corresponding cell after placement and routing are determinable as a function of characteristics of a layout file such as input slew and output load. A delay model can be represented in an entry in the cell library in the form of a table implemented according to the non-linear delay model NLDM utilized in products commercially available from Synopsys, Inc., or according to other delay models. Other delay models which can be utilized include models based on exploiting the device physics to arrive at the effective current during the transition, such as the $CV/I_{eff}$ delay model presented in M. H. Na, et al., "The effective drive current in CMOS inverters," Proc. IEDM, 2002, PP.

121-124 and inverter delay models in J. M. Draga et al., "A comprehensive delay macro modeling for submicrometer CMOS logics," IEEE JSSC, vol. 31, pp. 42-55, 1999, L. Bisdounis, et al., "Switching response modeling of the CMOS inverter for sub-micron devices," Proc. DATE, 1998, pp. 729-735, S. Dutta, et al., "A comprehensive delay model for CMOS inverters," IEEE JSSC, vol. 30, pp. 864-871, 1995, and P. Maurine et al., "Transition time modeling in deep submicron CMOS," IEEE T-CAD, vol. 21, pp. 1352-1363, 2002. Other delay models also can be implemented using approaches based on utilizing sampling schemes to arrive at empirical models for capturing the delay. Examples include response surface modeling (See B. P. Harish, et al. "On a generalized framework for modeling the effects of process variations on circuit delay performance using response surface methodology," IEEE T-CAD, vol. 26, pp. 606-614, 2007) and various regression models (See Forzan, B., "Accurate and efficient macromodel of submicron digital standard cells," Proc. DAC, 1997, pp. 633-637 and S. Basu, et al., "Variation aware spline center and range modeling for analog circuit performance," Proc. ISQED, 2008, pp. 162-167).

Entries in the cell library can also include parameters of a model to estimate, as a function of modifications of the initial form of the cell, a characteristic, such as $V_{SC}$, of a determinable event in cell switching behavior, where changes in the characteristic of the determinable event correlate with changes in delay of the corresponding cell relative to delay of the cell in the initial form, due to modifications and to the characteristics of the layout file. Also, entries in the cell library can include parameters of a delay change model to estimate as a function of the characteristic such as $V_{SC}$ of a determinable event, delay change due to the modification relative to delay of the initial form of the corresponding cell.

The modeling procedures described herein can be implemented at a library characterization stage of the process to characterize cell variants, such as variants of an inverter cell that have different gate lengths, to expand the cell library without requiring more rigorous characterization processes needed to produce a master cell characterization data set. As described in more detail below with reference to FIG. 15, a cell library can be implemented for use in, and can be utilized in, processes described herein.

Also, parameters of the modeling procedures can be added to the standard cell characterizing data for a master cell to be applied during constrained optimization procedures.

Figure 2:
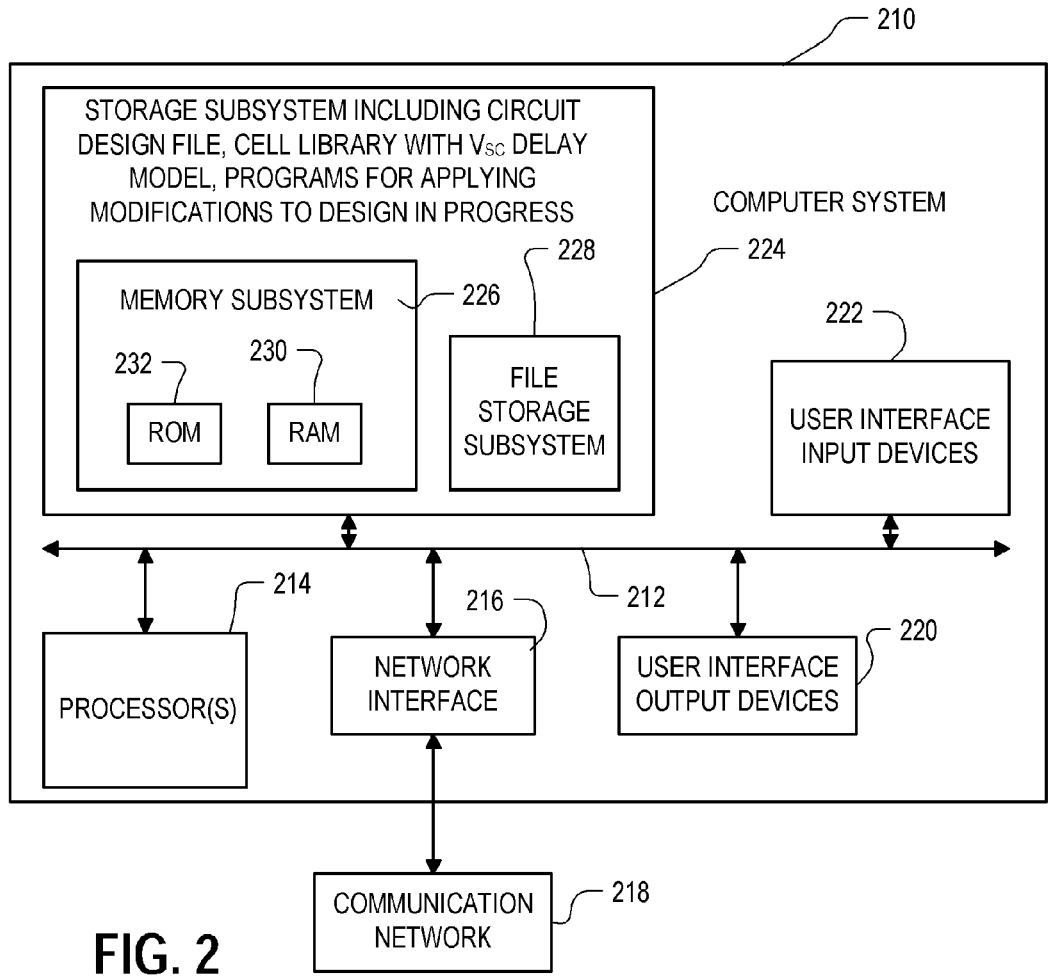
FIG. 2 is a simplified block diagram of a data processing system configured for operations described herein.

FIG. 2 is a simplified block diagram of a computer system 210 suitable for use with embodiments of the technology. Computer system 210 typically includes processor(s) 214 which communicates with a number of peripheral devices via bus subsystem 212.

The peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210, and typically include a graphical user interface. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image and supporting a graphical user interface usable by a designer. The display subsystem may also provide non-visual display such as via audio output devices. In general, use of the term "output device" is intended to include all possible types of devices and ways to output information from computer system 210 to the user or to another machine or computer system.

Storage subsystem 224 stores the basic programs of instructions and data constructs that provide the functionality of some or all of the EDA tools described herein, including the software modules for power optimization and delay change determinations as described herein. These software modules are generally executed by processor(s) 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 228. The memory subsystem 226 includes a database storing a layout file specifying a circuit design, such as a list of cells or cell instances that define the circuit in a placed and routed design specified, for example, using a tool such as IC Compiler. The database can include a design description expressed in VHDL, such as Verilog, a standard cell library used for the design, a technology file describing interconnect used in the circuit, and a design constraint file, specifying timing, capacitance, operating frequency and so on.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Figure 2A:
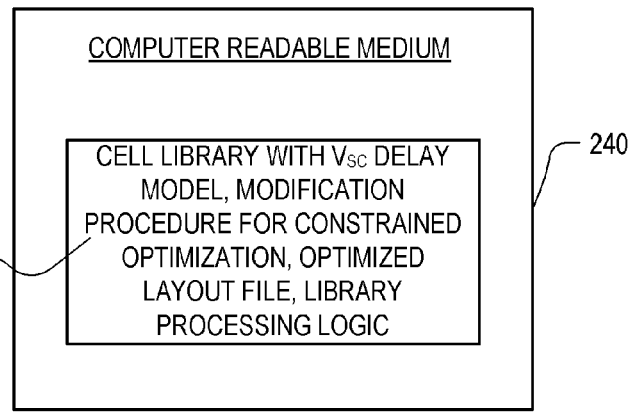
FIG. 2A is a simplified block diagram of a machine readable data storage medium storing data structures and computer programs as described herein.

FIG. 2A shows an article of manufacture comprising a computer readable medium 240, which can be a medium associated with, or included in, file storage subsystem 228, and/or with network interface subsystem 216. The computer readable medium 240 can be a hard disk, a floppy disk, a CD-ROM, an optical medium, removable media cartridge, a tape drive, flash memory or other data storage medium on which instructions executable by a computer and other data structures are stored for distribution and/or safekeeping. The computer readable medium 240 stores data structures and executable files 280 used for implementation of the technology described herein, including a program for constrained optimization of a circuit characteristic by applying a circuit modification procedure and computer-implemented models for delay for a master cell as a function of layout characteristics, computer-implemented models for $V_{SC}$, or other parameters, as a function of layout characteristics and modifications of the cell, and computer-implemented models for delay change as a function of $V_{SC}$, or of some other parameter as discussed herein. The computer readable medium 240 stores a layout file which is produced according to the processes described above, and in which shapes and locations of multiple layers of the cells selected for implementation, and of interconnect structures for connecting the cells, are specified for the lithographic masks, and integrated circuit structures to be manufactured are defined for use by machines implementing such masks and integrated circuits. The computer readable medium 240 stores the cell library including entries configured for use in the processes described herein.

The description of computer system 210 depicted in FIG. 2 is intended only as a specific example for purposes of illustrating the preferred embodiments. Many other configurations of computer system 210 are possible having more or less components than the computer system depicted in FIG. 2. The computer system 210 in some embodiments includes a number of stations, each of which can have the components illustrated in FIG. 2, in a distributed architecture or in a server farm arrangement, for performing operations over large layout files.

Figure 3:
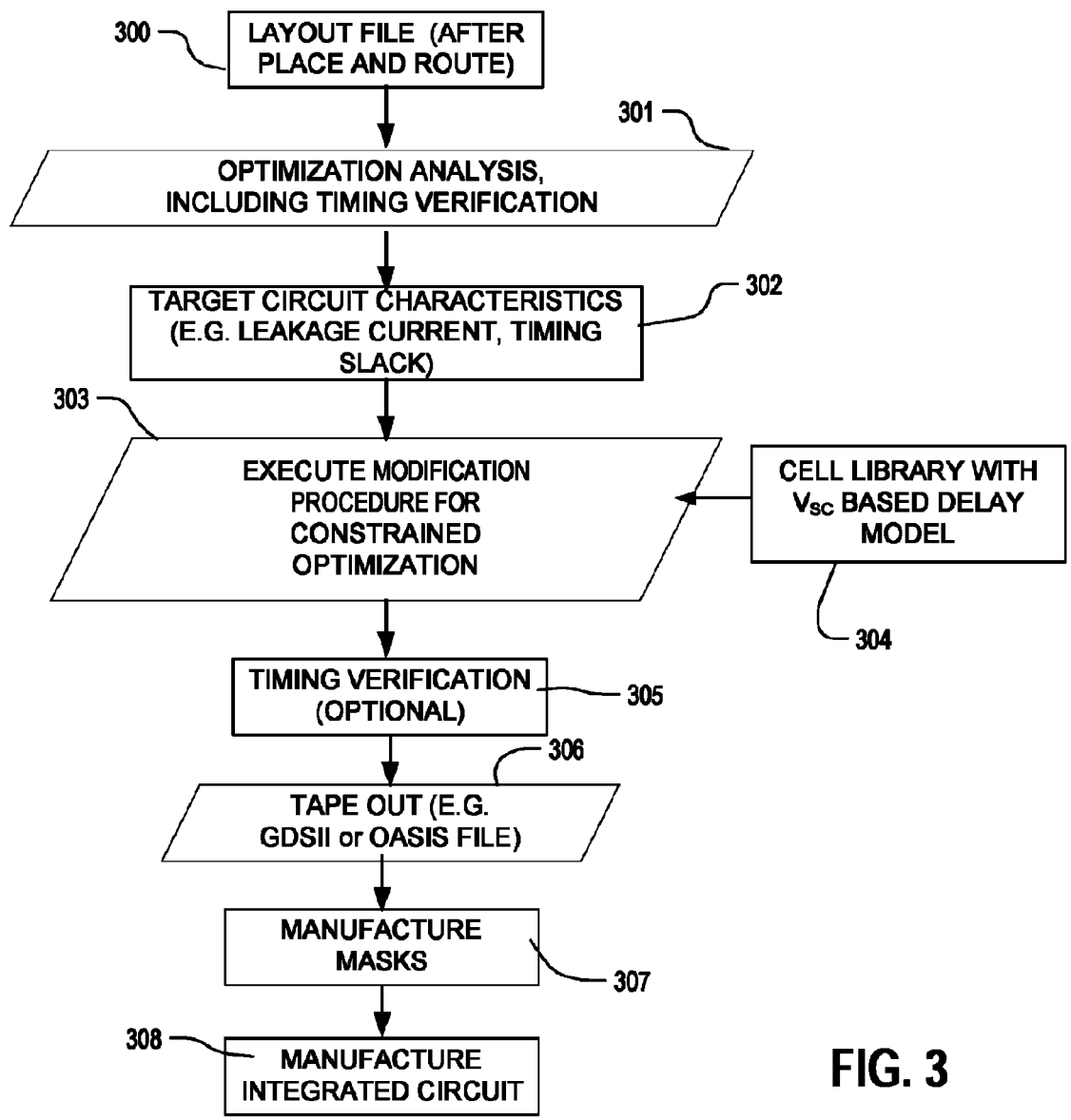
FIG. 3 is a flow chart of an EDA process applying a computer-implemented $V_{SC}$-based delay model to apply a timing constrained optimization process after place and route, such as for leakage power optimization.

FIG. 3 is a simplified flowchart for an EDA process utilizing technology described herein. This flowchart begins with input of the layout file after place and route (300). The layout file can have a hierarchical structure in which shapes and locations of multiple layers of the cells selected for implementation and of interconnect structures for connecting the cells are specified for the integrated circuit structure to be manufactured. Characteristics of the layout that are relevant to delay computations for individual cells, such as input slew S and output load $C_L$, are available from a layout file. After place and route, the layout file is submitted for optimization analysis (301). The optimization analysis can include, among other processes, extraction of parasitic capacitance and resistance and re-computation of timing performance of the design using the extracted parameters and information from the cell library for cells used in the layout file. As a result of the optimization analysis, characteristics of the design, including leakage power, timing slack and so on are available (302).

Given the characteristics of the target circuit design, a circuit modification procedure is applied to implement a constrained optimization of the target design (303), using a cell library 304. During the circuit modification procedure, changes in delay of the modified cells are determined by reference to the corresponding entries in the cell library 304, using the $V_{SC}$-based delay model, or another model that provides information about the changes in delay in the circuit paths in the design due to the modifications.

The layout file can then be processed for timing verification, if needed (305).

After timing verification, the resulting file is provided to a tape out process (306).

As a result of the tape out process, a tape out file is generated and stored on a machine readable storage device as shown in FIG. 2A, in which the target design is specified using a layout format language such as GDSII or the Open Artwork System Interchange Standard (OASIS) suitable for use by the manufacturer. Accordingly, a tape out file is provided that specifies layout of a target circuit design having been optimized according to the procedure described above.

Next, masks are manufactured to be used in the manufacturing process, typically after optical proximity correction (307). Accordingly, a mask set is provided for a target circuit design having been optimized according to the procedure described above. Finally, the integrated circuit is manufactured utilizing the masks (308). Accordingly, an integrated circuit is provided, for a target circuit design having been optimized according to the procedure described above.

One example of constrained circuit optimization described herein is leakage power reduction constrained by circuit timing characterized by slack. Optimization of a design for leakage power involves the constrained maximization of the objective function, where the objective function is the difference of initial leakage power and resulting leakage power, and the constraint is the maximum allowed delay increase for a given path given the initial slack on the path. The objective function can be maximized incrementally, where each step consists of an adjustment such as a gate length change or a drive strength adjustment like a channel width change, for a single cell instance and is guided by the cell delay and power sensitivity of the design. The stopping criterion for the optimization is achieved when the maximum allowed delay increase is violated. The maximum allowed delay increase can be specified as that delay increase which does not consume all of the available slack within an acceptable margin based on the models utilized to estimate delay and delay changes.

Figure 4:
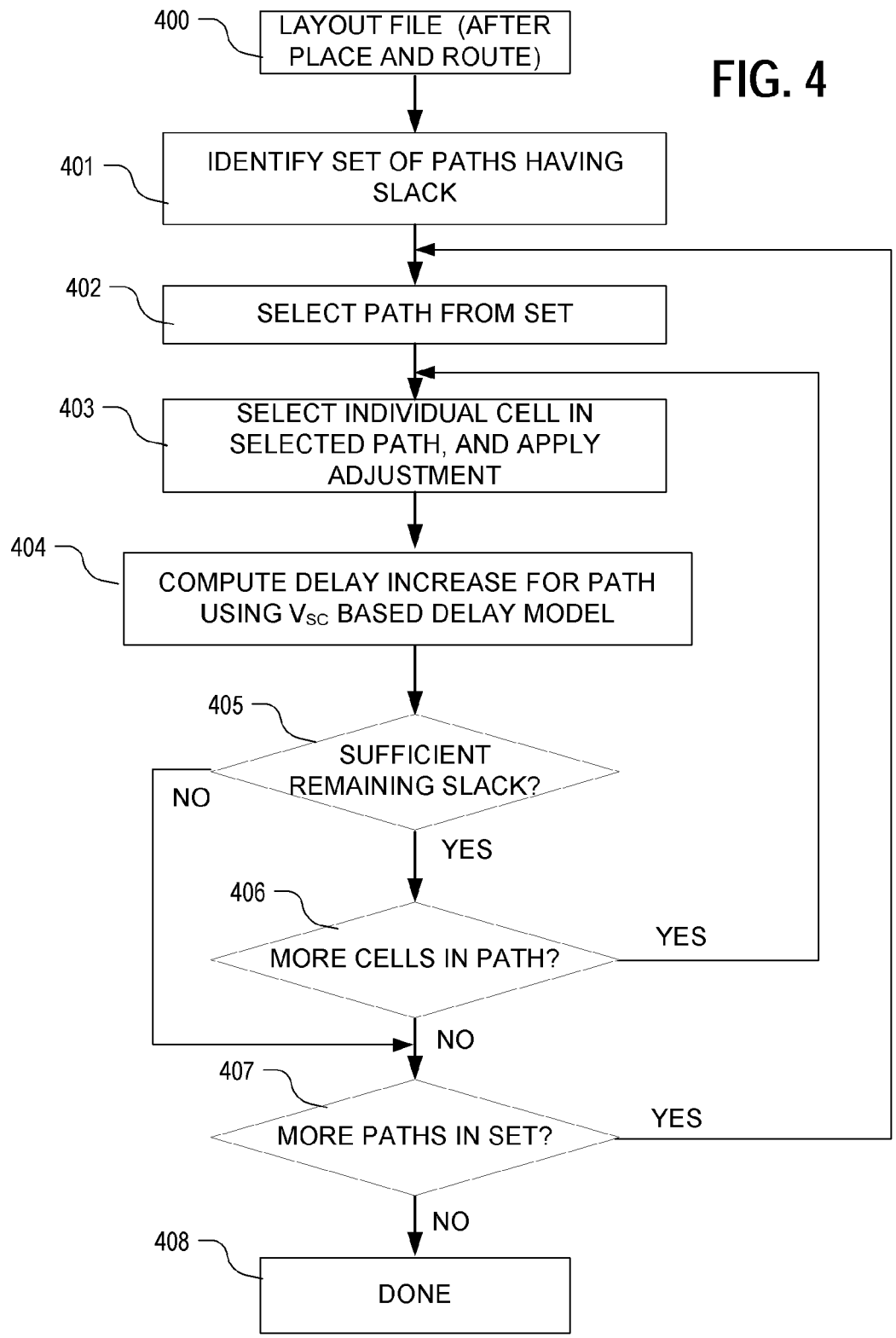
FIG. 4 is a flow chart for a procedure to implement a constrained circuit optimization utilizing a $V_{SC}$-based delay model.

FIG. 4 is a simplified flowchart for a timing constrained leakage power optimization, using a procedure such as gate length adjustment. In the process shown in FIG. 5, layout file 400 is provided. Next, the process identifies a set of paths in the layout file which have available timing slack (401). The process selects a path from the set (402). Next, the process selects an individual cell in a selected path and applies the adjustment (403). The delay increase as a result of the adjustment is computed using a $V_{SC}$-based delay change model, for the cell and for the path (404). Next, the process determines whether there is sufficient remaining slack to proceed with additional adjustments along the path (405). If there is sufficient remaining slack, the process determines whether there are more cells in the path to which the adjustment can be applied (406). If there are additional cells to which the adjustment can be applied, then the algorithm loops back to step 403 to select the next cell. If there are no additional cells in the path at step 406, or if it is determined that there is not sufficient remaining slack at step 405, then the process determines whether there are additional paths in the set (407). If there are additional paths in the set, then the process loops to step 402 to select the next path. If all the paths have been processed at step 407, then the procedure is done (408).

Figure 5:
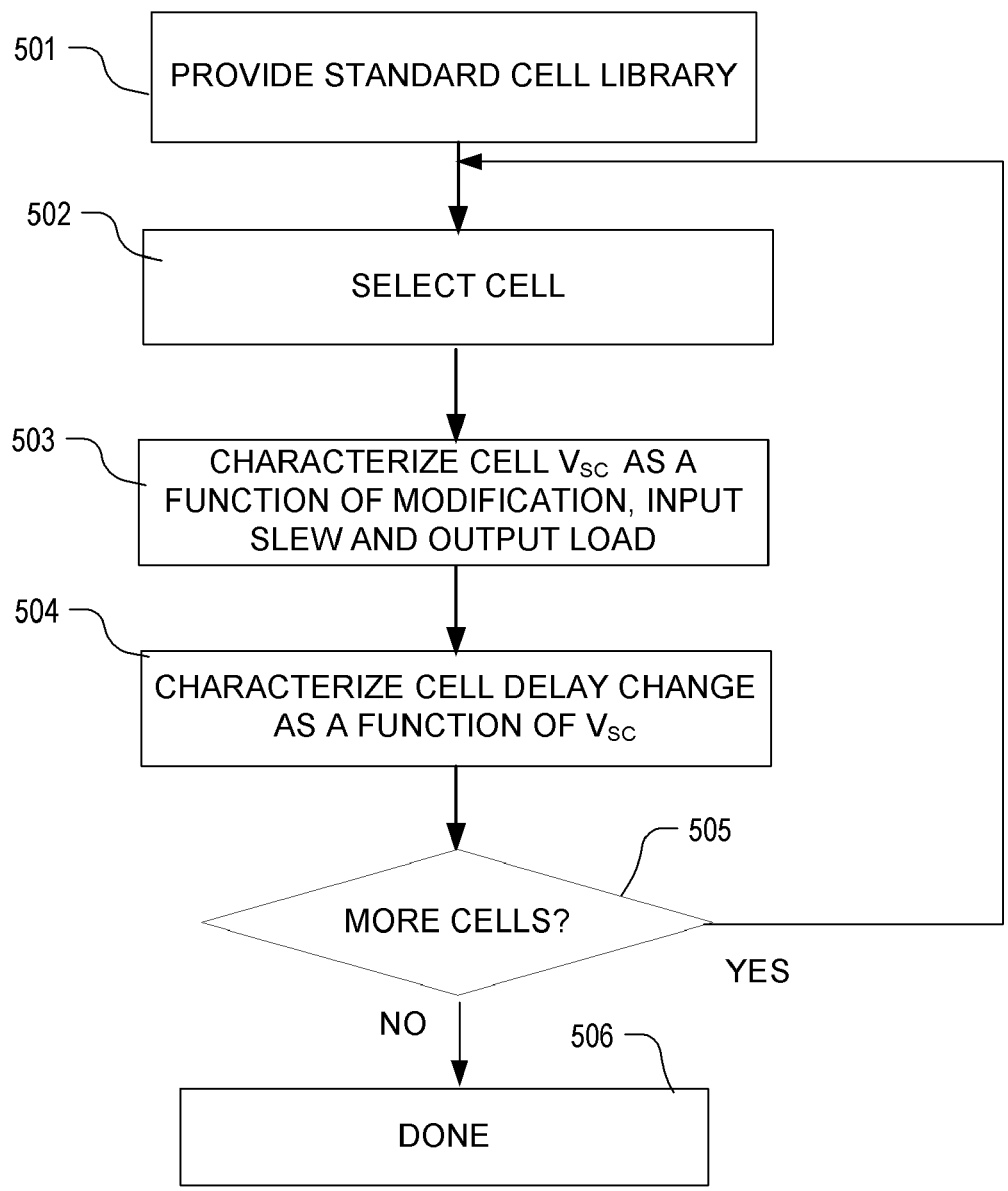
FIG. 5 is a flow chart for a procedure to produce a cell library including parameters for $V_{SC}$-based delay determinations.

FIG. 5 is a simplified flowchart of a process for implementing a cell library, such as the library 304 shown in FIG. 3, for use in the processes described herein. An input to the process includes a standard cell library, where the standard cell library includes entries for standard cells used as components of circuit design for a particular implementing technology (501). The process iterates across the entries into the cell library. This iteration begins with selecting a cell (502). Then a procedure is executed to analyze a selected cell to characterize the cell short-circuit voltage $V_{SC}$ as a function of a modification of the cell across ranges of characteristics of a layout in which the cell could be placed, such as a range of input slew and output load (503). The use of the parameters input slew and output load is particularly desirable for systems in which the nonlinear delay model is implemented in the standard cell library for estimating delay of the cell in the initial form, as that model is characterized in the cell library by a table which is indexed by input slew and output load. Next, a procedure is executed to analyze the selected cell to characterize delay change as a function of the cell short-circuit voltage $V_{SC}$ (504). Information characterizing the cell short-circuit voltage $V_{SC}$ as a function of modifications of the cell, and characterizing delay change as a function of the cell short-circuit voltage $V_{SC}$ is then added to, or otherwise associated with, the entry in the cell library for the selected cell. According to the iteration, it is determined whether there are additional cells in the cell library for processing (505). If there are additional cells, the process loops back to step 502 to continue processing the cell library. If all of the cells that are available for this type of processing have been processed, then the algorithm is done (506). The cell library modified according to this procedure can be stored in memory of the data processing system, such as that shown in FIG. 2. Also, the cell library can be utilized for optimization after placement and routing, where the information such as input slew and output load are available for indexing into the delay model, and for indexing into the model for determining changes in delay as a result of modification.

With reference to FIGS. 6 through 12, models are described, which can be applied for characterizing cell short-circuit voltage $V_{SC}$ as a function of modifications of the cell, and for characterizing delay change as a function of the cell short-circuit voltage $V_{SC}$.

Figure 6:
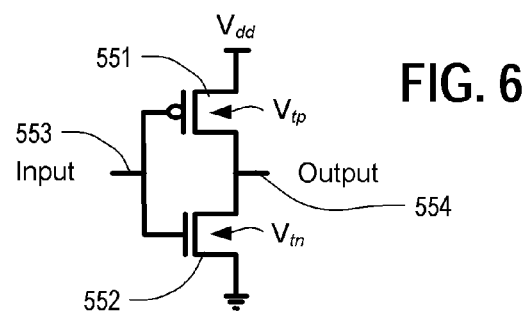
FIG. 6 is a circuit diagram of an inverter for reference.
Figure 6A:
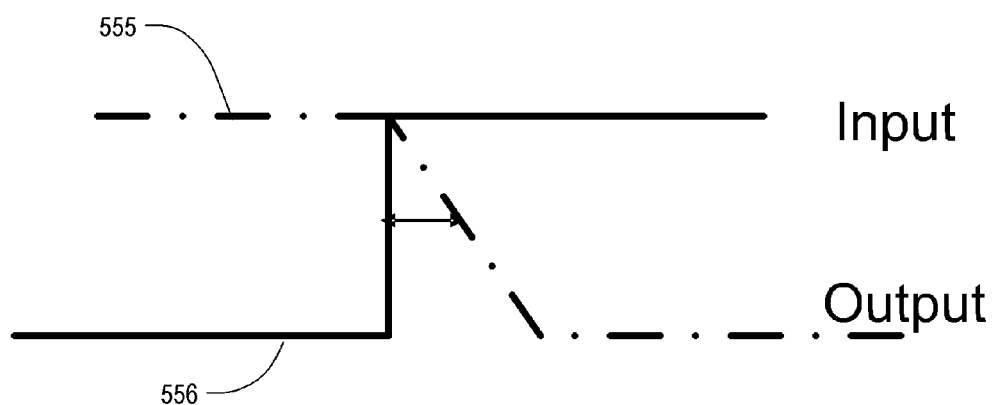
FIG. 6a is a graph of input voltage versus output voltage for a cell transition in the case of an ideal rising step input.

FIG. 6 is a circuit diagram of a basic inverter cell which includes a p-channel pull-up transistor (PMOS) 551 having a threshold voltage $V_{tp}$ and an n-channel pull-down transistor (NMOS) 552 having a threshold voltage $V_{tn}$, in series between a supply potential $V_{dd}$ and ground. An input 553 is coupled to the gates of transistors 551 and 552. An output 554 is provided at the common terminal between the drains of the two transistors. FIG. 6a is a graph of the input and output waveforms for an ideal step input ramp for an inverter. As the input 556 transitions between zero volts and $V_{dd}$, the output 555 begins to switch from $V_{dd}$ to zero volts on the transition, and ramps down to zero volts.

For the delay modeling, one can characterize drain current $I_d$ of a PMOS and an NMOS transistor using one of a number of models. For this example, the alpha power law model as described in T. Sakurai, et al. "A simple short-channel MOSFET model and its application to delay analysis of inverters and series-connected MOSFET's," Proc. ISCAS, May 1990, pp. 105-108 is adopted. It characterizes the drain current of a MOS transistor according to equation (1) as follows:

$$I_d = \begin{cases} 0 & \text{Cut-off} \\ K\frac{W}{L}(V_{gs} - V_t)^\alpha & \text{Saturation} \\ K_a K\frac{W}{L}(V_{gs} - V_t)^{\alpha/2} V_{ds} & \text{Linear} \end{cases} \quad (1)$$

where K and $K_a$ are technology dependent constants, W is transistor gate width (correlating with drive strength) and L is transistor gate length (correlating with threshold voltage).

The threshold voltage of the transistor used in equation (1) can be pre-characterized using SPICE simulations for example for both transistors as a function of gate length, or gate length change $\Delta L$, and drain voltage $V_{ds}$. This relationship can be characterized by a polynomial of the form of equation (2) as follows:

$$V_t(V_{ds},\Delta L) = c_0 + (c_1\Delta L - c_2)V_{ds}^2 + (c_3\Delta L - c_4)V_{ds} + c_5\Delta L \quad (2)$$

For an ideal step input as shown in FIG. 6a, only the PMOS transistor (501) is active during the transition. The inverter delay (D) can be approximated as shown in equation (3), and simplified as shown in equation (4), as follows:

$$\frac{C_L V_{dd}}{2} = \int_{t=0}^{delay} \text{In}(t)dt \approx \frac{1}{2}[\text{In}(V_{out}=V_{dd}) + \text{In}(V_{out}=V_{dd}/2)](\text{delay}) \quad (3)$$

$$\text{delay} = \frac{C_L V_{dd}}{I_{satn}|_{V_{in}=V_{dd}, V_{out}=V_{dd}} + I_{linn}|_{V_{in}=V_{dd}, V_{out}=V_{dd}/2}} \quad (4)$$

In these equations, $C_L$ is the load capacitance of the inverter and $I_{satn}$ is the current at the point at which the input voltage is $V_{dd}$ and the output voltage is $V_{dd}$, and $I_{linn}$ is the current at the point at which the input voltage is $V_{dd}$ and the output voltage is $V_{dd}/2$, which when summed and divided by 2 can approximate the average current during the transition.

Each current component in equation (4) can be calculated using for example, the alpha power law model as shown in equation (1). A percentage delay change as a result of gate length change can be calculated using equation (5) as follows:

$$E_1 \equiv \text{delay }\% = \frac{\text{delay}(L-\Delta L)}{\text{delay}(L)} - 1 \quad (5)$$

In this equation, where L is the gate length of the transistor in its initial form in the cell library, and $\Delta L$ is the change in gate length (or effective gate length change) as a result of modification of the cell.

Figure 7:
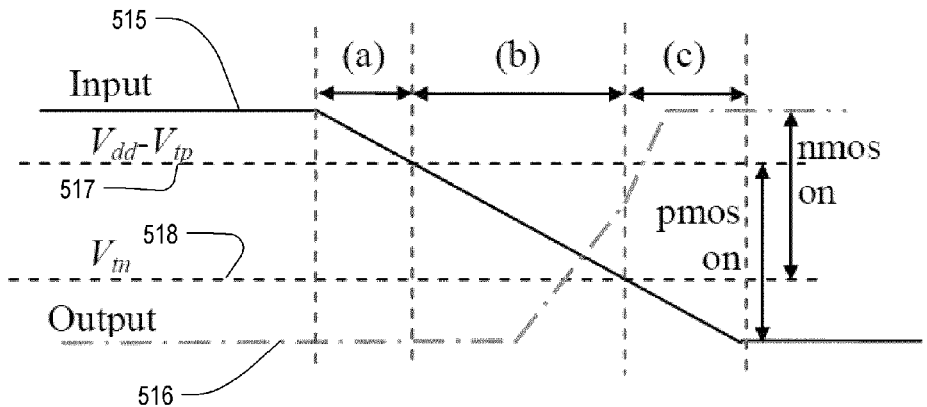
FIG. 7 is a graph of input voltage versus output voltage for a cell transition in illustrating three regions in the switching behavior of the inverter.

As described with reference to FIG. 7, behavior of the inverter can be characterized by a switching model having three (or more) distinct behavioral regions. The regions shown in FIG. 7 can be defined with reference to the threshold voltages $V_{tp}$ and $V_{tn}$ of the transistors. FIG. 7 is a plot of input voltage 515 and output voltage 516 during a cell transition in which the input voltage ramps downward from $V_{dd}$ to ground and the output voltage switches from ground to $V_{dd}$ as a result. Threshold levels 517 and 518 are illustrated. The level 517 corresponds with $V_{dd}-V_{tp}$, which is the voltage at which the PMOS transistor turns on as the input voltage drops. The level 518 corresponds with $V_{tn}$, which is a voltage at which the NMOS transistor turns off as the input voltage drops.

There are three distinct behavior regions (a), (b), and (c) illustrated in the figure. In region (a) the NMOS transistor is on while the PMOS transistor is off. In this region, the output is pinned to ground. In region (b), both the NMOS transistor and the PMOS transistor are on. Region (b) is referred to as the short-circuit region in the behavior of the inverter. In this region, the output node is simultaneously charged by PMOS current and discharged by NMOS current. In region (c), the input voltage is low enough to turn off the NMOS transistor, while the PMOS transistor remains on to continue the charging up of the output node. Thus, the three distinct regions illustrated in FIG. 7 show a cell switching model in which there are three regions in which different behaviors dominate the cell switching.

An analytical equation for delay of the cell is based on a quantity referred to as the short-circuit voltage $V_{SC}$, which represents the output voltage at the end of region (b). The end of region (b) is a transition in the cell switching model from the region in which one behavior (short-circuit behavior) dominates the cell switching to a region in which another behavior (PMOS only current) dominates cell switching. As described in more detail below, changes in the short-circuit voltage $V_{SC}$ as a result in modifications of the cell, such as gate length modifications, correlate with changes in delay as a result of those modifications.

Figure 8:
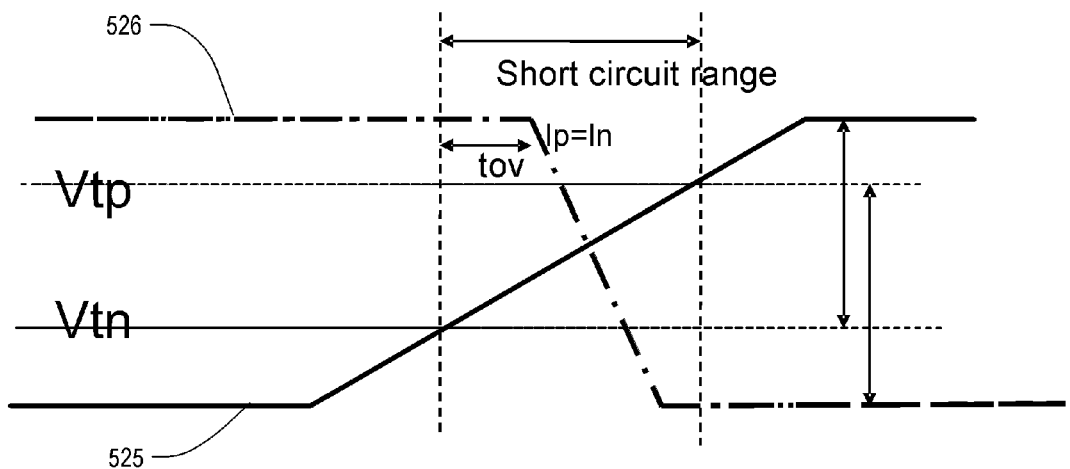
FIG. 8 is a graph of input voltage versus output voltage for a cell transition in the case of a rising input voltage where $V_{SC}$ is zero.

FIG. 8 through FIG. 11 illustrate representative cell switching behaviors in which the voltage $V_{SC}$ can be determined. In FIG. 8, rising input voltage 525 has a relatively slow ramp (i.e. low slew rate) and the output load has a relatively small capacitance, and in which there is a large overdrive ratio causing the n-channel current to be much greater than the p-channel current. As a result, the output voltage 526 switches relatively rapidly and $V_{SC}$ is equal to zero volts. In the figure, the time interval labeled $t_{ov}$ corresponds to the time between the start of the short-circuit range until the PMOS current $I_p$ equals the NMOS current $I_n$. In this case, the delay can be calculated as shown in equations (6), (7) and (8) derived in the Daga et al., IEEE J. of Solid-State Circuits, 1999, as follows:

$$\text{delay} = \frac{V_{tn,Vdd}}{V_{dd}}T + t_{ov} + \frac{C_L V_{dd}/2}{I_{ave}} - \frac{T}{2} \quad (6)$$

$$I_{ave} = \frac{1}{2}(I_{satn} - I_{satp})\Big|_{V_{in}\approx V_{dd}/2, V_{out}=V_{dd}/2} \quad (7)$$

$$t_{ov} = \frac{1}{2}\left(1 + \frac{V_{tn,Vdd/2,\Delta L}}{V_{dd}}\right)T + 2\frac{C_m}{C_L}(\text{Delay}_{case1}) \quad (8)$$

The notation $V_{tn,\,Vdd/2}$ indicates the threshold voltage for the NMOS transistor at the point in which its drain voltage is equal to $V_{dd}/2$. $I_{ave}$ is evaluated at the point at which $V_{in}$ is about $V_{dd}/2$ and $V_{out}$ is about $V_{dd}/2$. The value $t_{ov}$ is the delay between the start of the short circuit range, and the time at which the pull up current $I_p$ equals the pull down current $I_n$. The parameter T is the magnitude of the rail to rail transition time on the input, which is typically proportional to the input slew value utilized in the NLDM. $C_m$ is a maximum load capacitance specified for the cell, typically available in the cell library. The notation (Delay$_{case1}$) refers to the delay computed for the ideal step inverter as discussed above with reference to FIG. 6a.

Figure 9:
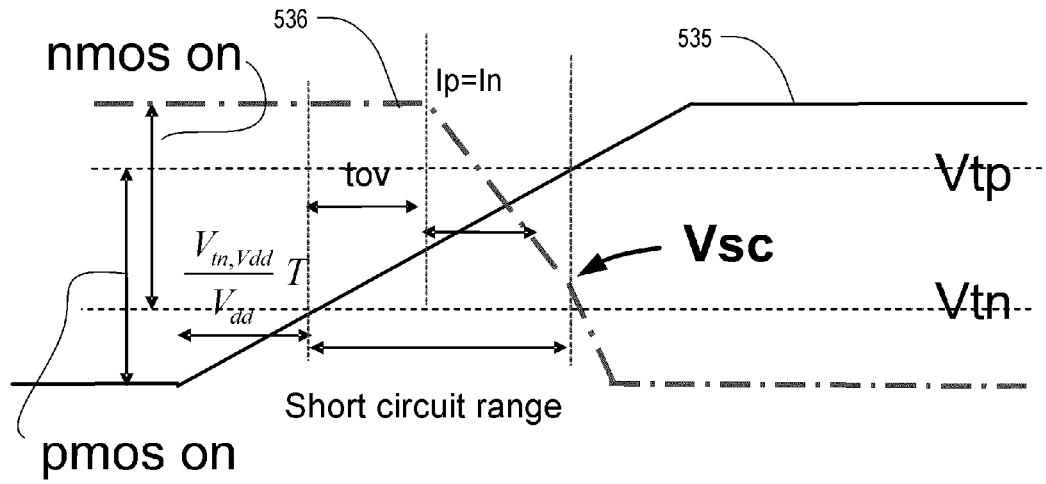
FIG. 9 is a graph of input voltage versus output voltage for a cell transition in the case of a rising input voltage where $V_{SC}$ is less than $V_{dd}/2$.

In the conditions shown in FIG. 9, a rising input voltage 535 has a relatively slow ramp and the output capacitance is relatively small, or alternatively the case in which there is a fast input ramp and a larger output capacitance causing $V_{SC}$ to occur relatively late, and fall below $V_{dd}/2$. The output voltage 536 falls relatively quickly. In this case, the short-circuit voltage is less than $V_{dd}/2$ and greater than zero. The delay in this case has four parts, including the section from the time of the start of the input ramp up until the beginning of the short-circuit range, section $t_{ov}$ and the section between the end of $t_{ov}$ and when the output voltage reaches $V_{dd}/2$. T/2 provides an estimate of the remainder of the fall time on the output. In this rising input voltage case, the $t_{ov}$ time interval does not contribute much to percentage change in delay. The delay of the cell in this condition can be computed as shown in equation (6) where $I_{ave}$ is computed as shown in equation (9), as follows:

$$I_{ave}=\tfrac{1}{2}I_{linn}|_{V_{in}=V_{dd}-V_{tp}(\Delta L,V_{dd}-V_{SC}),V_{out}=V_{SC}} \quad (9)$$

The subscript notation on the voltage $V_{tp}(\Delta L, V_{dd}-V_{SC})$ indicates the PMOS threshold voltage $V_{tp}$ for the case of gate length change $\Delta L$, in which the NMOS drain voltage is $V_{dd}-V_{SC}$. Thus, $I_{ave}$ is calculated as the average NMOS current $I_{linn}$ from the zero current level as the start of the ramp to a current level evaluated when input voltage that is close to a level at which the PMOS transistor current becomes dominant, and the output voltage is about $V_{dd}-V_{SC}$.

Figure 10:
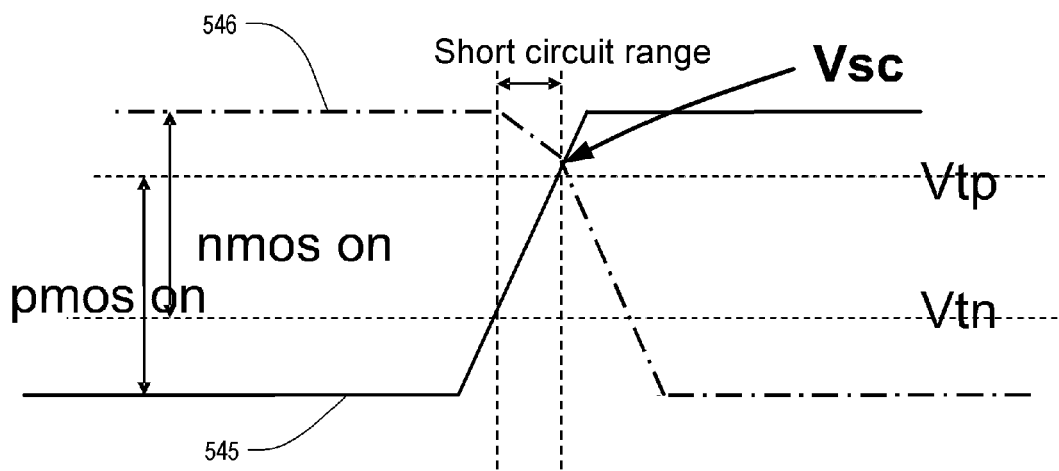
FIG. 10 is a graph of input voltage versus output voltage for a cell transition in the case of a rising input voltage where $V_{SC}$ is greater than $V_{dd}/2$.

FIG. 10 shows the conditions in which $V_{SC}$ is greater than $V_{dd}/2$ for a rising input voltage 545 and falling output voltage 546. In this case, the input voltage has a faster ramp with a smaller output capacitance or a slower ramp with a larger output capacitance. As a result, the output voltage falls relatively slowly compared to the rise time of the input voltage, and $V_{SC}$ is greater than $V_{dd}/2$. In this case, the delay of the cell can be computed as shown in equations (10) and (11), as follows:

$$\text{delay} = \frac{V_{tn}(\Delta L, V_{dd})}{V_{dd}}T + t_{ov} + \frac{C_L V_{dd}/2}{I_{ave}} - \frac{T}{2} \quad (10)$$

$$I_{ave} = \frac{1}{2}\left(I_{satn}|_{V_{in}=V_{dd}-V_{tp}(\Delta L,V_{dd}-V_{SC}),V_{out}=V_{SC}} + I_{linn}|_{V_{in}\approx V_{dd},V_{out}=V_{dd}/2}\right) \quad (11)$$

Figure 11:
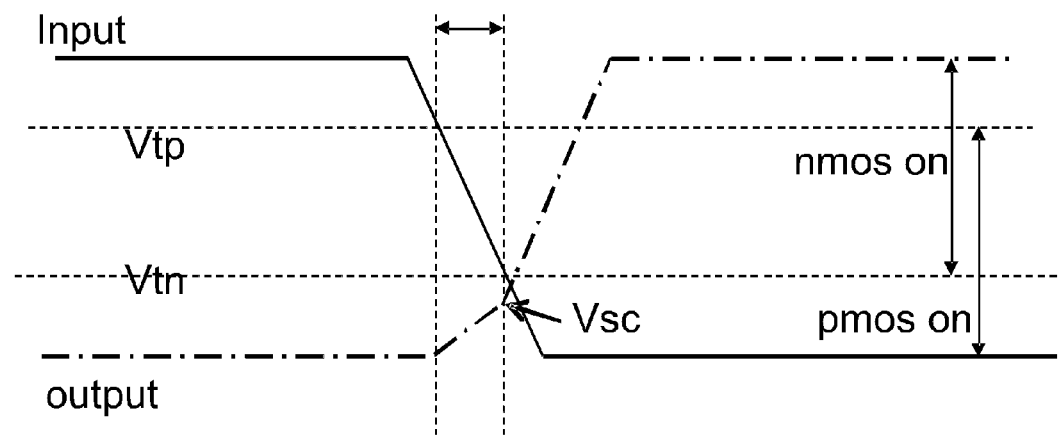
FIG. 11 is a graph of input voltage versus output voltage for a cell transition in the case of a falling input voltage where $V_{SC}$ is less than $V_{dd}/2$.

FIG. 11 illustrates conditions for a falling input voltage, where $V_{SC}$ is less than $V_{dd}/2$. This case occurs when the input is fast while the output capacitance is relatively small, or when the input is a slow falling ramp and the output capacitance is relatively large. The inverter delay in this case is composed of two parts, including (1) the time required for the circuits to reach the end of the short-circuit region, and (2) the time required for the output to rise from $V_{SC}$ to $V_{dd}/2$. The delay can be computed as shown in equation (12), as follows:

$$D = \left(T - \frac{V_{tn}(V_{sc}, \Delta L)}{V_{dd}}T\right) + \frac{C_L(V_{dd}/2 - V_{sc})}{I_{ave}} - \frac{T}{2} \quad (12)$$

In equation (12), the first-term addresses the delay component of part (1) and the second term addresses the delay component of part (2). $I_{ave}$ is calculated as the average of the PMOS current at the end of the short-circuit region and at the point where the output voltage reaches $V_{dd}/2$, as in equation (13):

$$I_{ave}=\tfrac{1}{2}(I_{P,Sat}|_{V_{in}=V_{tn}(V_{sc},\Delta L),V_{out}=V_{sc}}+I_{P,Lin}|_{V_{in}=0,V_{out}=V_{dd}/2}) \quad (13)$$

Figure 12:
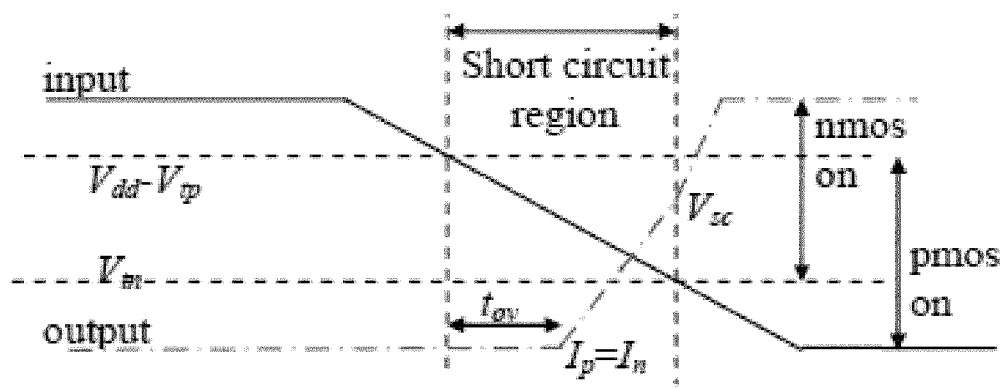
FIG. 12 is a graph of input voltage versus output voltage for a cell transition in the case of a falling input voltage where $V_{SC}$ is greater than $V_{dd}/2$.

FIG. 12 illustrates the conditions for a falling input voltage, where $V_{SC}$ is greater than $V_{dd}/2$. This condition is typically true for a slow falling input with a small output capacitance, or a fast falling input with a large output capacitance. The delay for the inverter is determined by the time required for the inverter to enter the short-circuit region, plus the time required for the output to rise from the value at the start of the short-circuit region to $V_{dd}/2$. The delay can be expressed as shown in equation (14):

$$D = \left(\frac{V_{tp}(V_{dd}, \Delta L)}{V_{dd}}T\right) + \frac{C_L V_{dd}/2}{I_{ave}} - \frac{T}{2} + t_{ov} \quad (14)$$

One can assume that changes in $t_{ov}$ as a function of changes in gate length are small, and therefore can be dropped from the equation when considering changes in delay. The value $I_{ave}$ in equation (14) is approximated by the average net current at the end of $t_{ov}$ which is about zero, and at the end of the short-circuit region, as calculated in equation (15):

$$I_{ave}=\tfrac{1}{2}I_{P,Lin}|_{V_{in}=V_{tn}(V_{sc},\Delta L),V_{out}=V_{sc}} \quad (15)$$

Given these models for the behavior of the cell, the quantity $V_{SC}$ can be evaluated as a function of the gate length, output load capacitance and input slew rate (S), which is usually defined at custom threshold levels and is proportional to the rail to rail input ramp time T. In the case of a rising output, the condition under which $V_{SC}$ is relatively large occurs the output capacitance is small or the gate length is small such that the relative pull-up strength is large. The relatively large $V_{SC}$ is expected also when the short-circuit region is long, i.e., the input ramp is slow. In the case of a falling output, the condition under which $V_{SC}$ is large is the opposite. Combining these observations, empirical expressions for $V_{SC}$ can be developed for the case of output rising/output falling respectively. The formulation of these expressions can ensure that $V_{SC}$ always falls between zero and $V_{dd}$.

For a system utilizing a nonlinear delay model, expressions for $V_{SC}$ can be developed by evaluating the behavior of the cell over the extent of the ranges of input slew and output load represented by entries in the NLDM table, such as a 7 by 7 matrix over input slew and output load. A representative equation for characterizing $V_{SC}$ is provided in equation (16) as follows:

$$V_{SC} = \left[ w_1 \left( \frac{C_{Lmin}}{C_L} \right)^{a_1} + w_2 \left( \frac{T}{T_{max}} \right)^{a_2} + w_3 \left( \frac{L_{nom}}{L_{nom} + \Delta L} \right)^{a_3} + w_0 \right] \frac{V_{dd}}{(w_1 + w_2 + w_3 + w_0)} \quad (16)$$

Coefficients for the fitting function include $w_0$, $w_1$, $w_2$, $w_3$, $a_1$, $a_2$ and $a_3$. Other forms of fitting functions can be applied as well, and chosen by a designer. Also, embodiments can be applied in which the fitting functions for $V_{SC}$ and other values, are different for different cells in a single library, chosen to provide a best fit. $L_{nom}$ is the gate length of the master cell. $T_{max}$ is a maximum transition magnitude specified for the cell.

Figure 13:
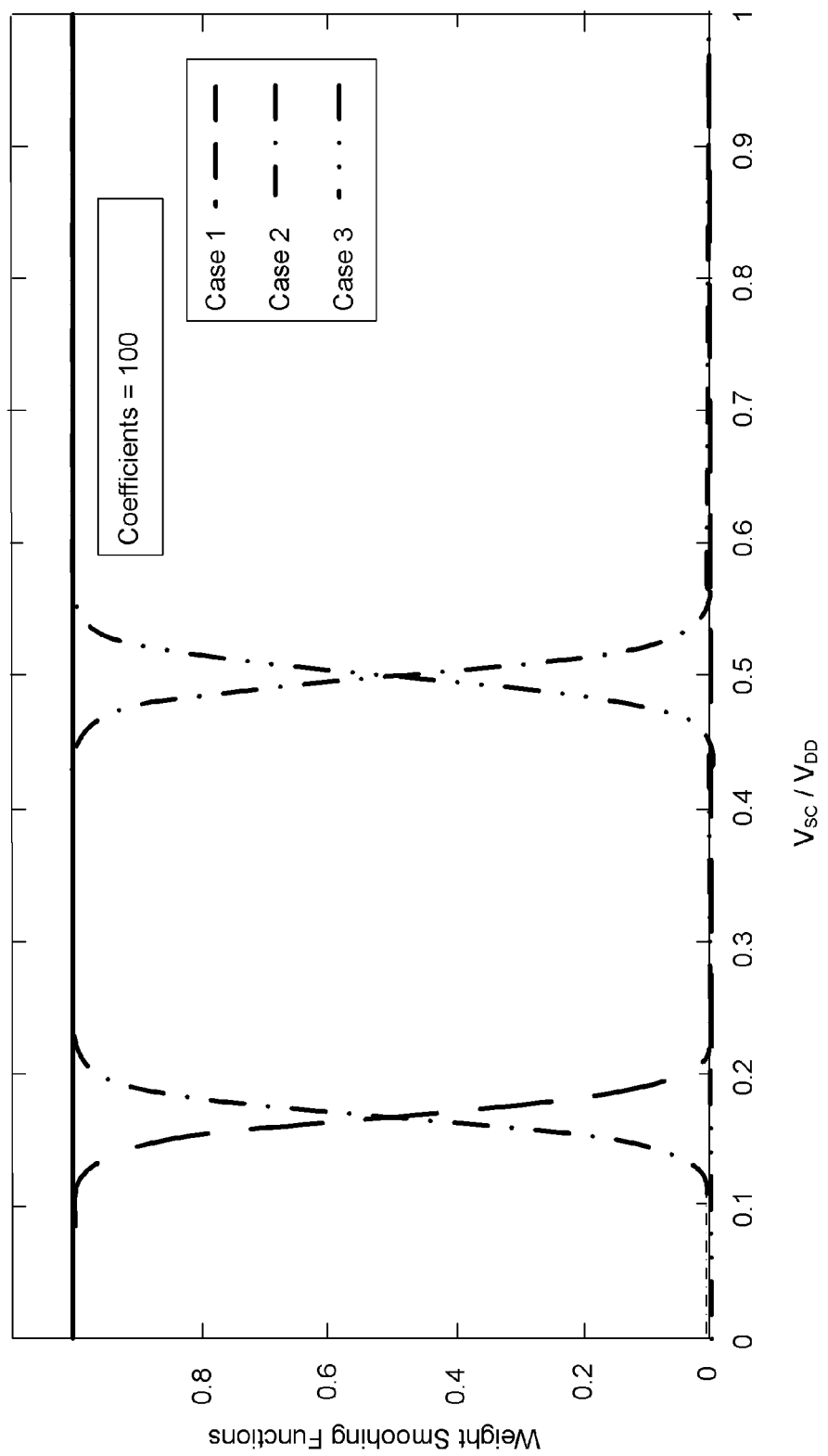
FIG. 13 is a graph of sigmoid smoothing functions applied to create a final expression for percentage changes in delay as a function of multiple behavioral regions in the switching behavior of the cell.

A final model construction can be produced by combining the different cases for calculating percentages in delay, using sigmoid smoothing functions. This provides an expression for percentage change in delay as a linear combination of all the percentage changes in delay calculated from the cases discussed above, multiplied by the corresponding smoothing functions. A representative characterization is shown in FIG. 13. FIG. 13 is a plot of the ratio of $V_{SC}$ to $V_{dd}$ on the horizontal axis versus the weighting function applied to the corresponding case on a vertical axis. In the example shown, the case 1 plot corresponds with a fast, near ideal rising input ramp where $V_{SC}/V_{dd}$ is small, the case 2 plot corresponds with the condition represented by FIG. 9 where $V_{SC}/V_{dd}$ is less than 0.5, and the case 3 plot corresponds with the condition represented by FIG. 10 where $V_{SC}/V_{dd}$ is more than 0.5. The fourth case represented by FIG. 8 can be omitted from the modeling in some embodiments. An integral delay change model can be represented by equation (18) as follows:

$$\Delta D = k_0 + k_2 \left[ \left( 1 - \frac{1}{1 + e^{m_1 \left( V_{SC} + \frac{V_{dd}}{6} \right)}} \right) E_1 + \left( 1 - \frac{1}{1 + e^{m_2 \left( -V_{SC} + \frac{V_{dd}}{2} \right)}} \right) \right. \\ \left. \frac{1}{1 + e^{m_1 \left( -V_{SC} + \frac{V_{dd}}{6} \right)}} E_2 + \frac{1}{1 + e^{m_2 \left( -V_{SC} + \frac{V_{dd}}{2} \right)}} E_3 \right] \quad (17)$$

Where $\Delta D$ is a change in delay, and the coefficients for the smoothing function in this form include $k_0$, $k_2$, $m_1$, $m_2$, $E_1$, $E_2$ and $E_3$.

As a result of this analysis, model parameters can be associated with cells in the cell library including those in the following table:

| | MODEL PARAMETERS | |
|---|---|---|
| Parameter | Description | Type |
| $w_0$ | Coefficients introduced to modeling $V_{sc}$ | Fitting Parameters |
| $w_1$ | | |
| $w_2$ | | |
| $w_3$ | | |
| $a_1$ | Exponent introduced to model $V_{sc}$ | |
| $a_2$ | | |
| $a_3$ | | |
| K | Constants for alpha-power law model | |
| $K_a$ | | |
| A | | |
| $m_1$ | Weighting factors in the smoothing functions | |
| $m_2$ | | |
| T | Input rail-to-rail rise/fall time | |
| $c_1$ | $T = c_1 S$ | |
| W | Gate width (drive strength) | Input Parameters |
| L | Gate length | |
| S | Input slew rate | |
| $C_L$ | Output load capacitance | |
| $k_0$, $k_2$, $E_1$, $E_2$, $E_3$ | Sigmoid Smoothing Function coefficients | Fitting Parameters |

Figure 14:
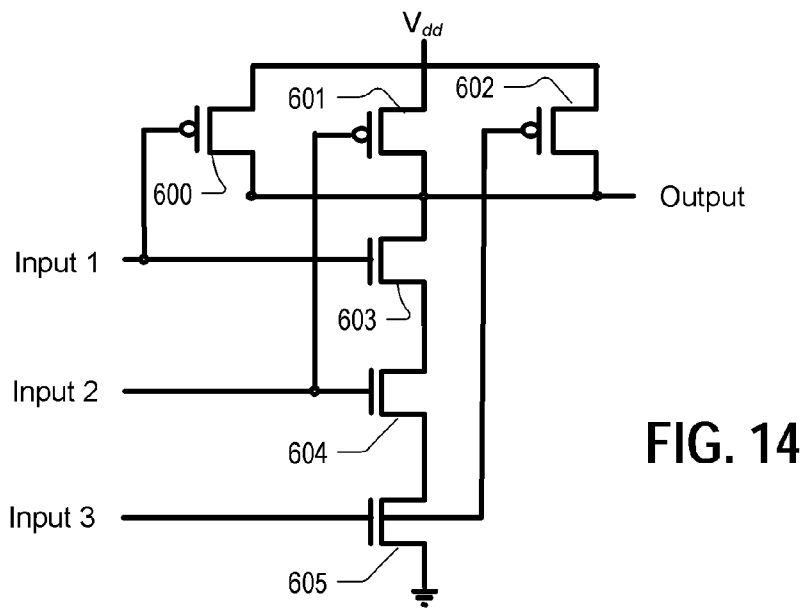
FIG. 14 is a circuit diagram for a 3-input NAND gate for reference.

This procedure for computing the short-circuit voltage can be extended to more complex gate, such as a multiple input NAND gate as illustrated in FIG. 14. The NAND gate in FIG. 14 has three inputs, input 1, input 2, input 3. It is composed of six transistors including the three PMOS transistors 600-602 connected in parallel between $V_{dd}$ and the output, and three NMOS transistors 603-605 connected in series between the output and ground. The delays are computed for conditions in which each of the NMOS transistors is treated as the switching transistor. Analytical procedures such as that described above can be utilized for each of the timing arcs to develop the delay model as a function of the $V_{SC}$.

The model described herein can be developed for cell modifications that impact single transistors within the corresponding cell or which are composed of modifications in multiple transistors within the corresponding cell.

Figure 15:
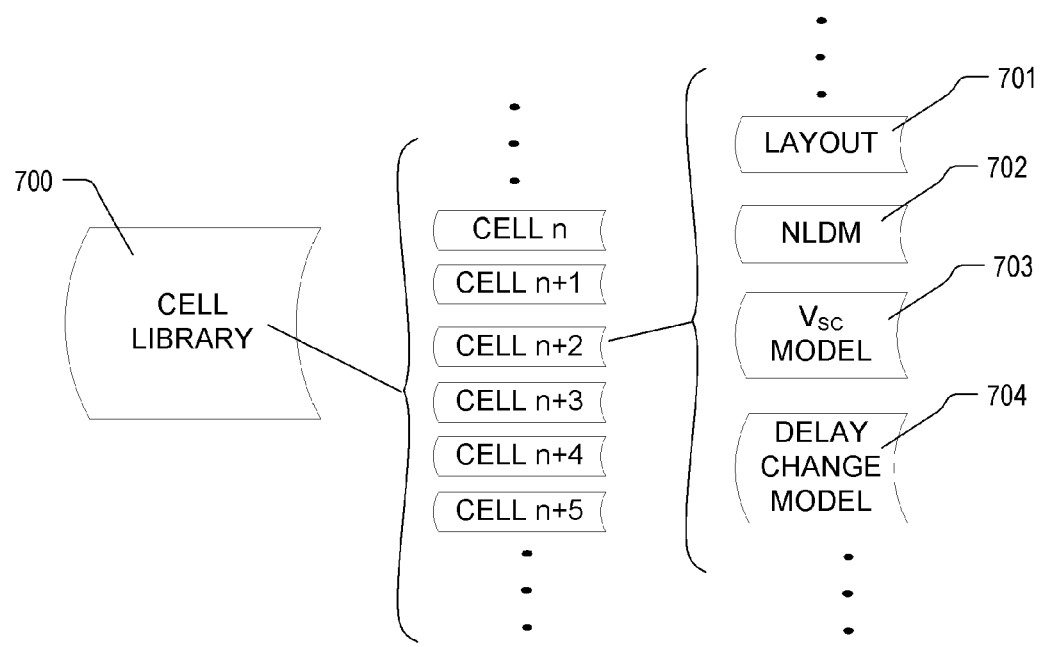
FIG. 15 is a simplified diagram of a cell library implemented with a $V_{SC}$-based delay change model as described herein.

FIG. 15 is a schematic diagram of a cell library which has been developed as described herein for use in applying the $V_{SC}$-based delay change computations. Cell library 700 includes a plurality of entries labeled CELLn to CELLn+5 in the illustration. Each entry includes characterizing data for a corresponding cell realizable in an initial form by a technology. The characterizing data includes layout data 701 and other parameters for characterizing the cell in initial form. In addition, the characterizing data includes delay model data 702, such as a nonlinear delay model table or other delay information from which delay values for the corresponding cell are determinable as a function of input slew and output load for the cell in the initial form (or other factor related to the placement and routing applied to the cell). In addition, a set of parameters for a delay change model, such as the $V_{SC}$-based model described herein, including a model 703 for determining $V_{SC}$ as a function of modifications of the cell, and a model 704 for determining percentage change in delay based on the value of $V_{SC}$.

Using a delay change model as described herein, values are determinable for adjustment of the delay values as a result of a modification to implement an adjusted form of the cell. The delay change model can include a function of a characteristic such as an output voltage of a determinable event in a cell switching behavior, where changes in the characteristic of the determinable event correlate with changes in delay of the cell switching according to the delay change model.

One such event can be characterized by a voltage at a transition in the cell switching model from a region in which one behavior dominates the cell switching to a region in which another behavior dominates cell switching. Movement of that transition can be translated into an estimate of delay changes due to modifications of the nominal form of the cell.

A determinable event of this type is characterized by the value of voltage $V_{SC}$ in embodiments described here, where $V_{SC}$ is equal to the output voltage for the cell in the adjusted form at the event in which $V_{in}$ crosses outside the "short circuit" behavioral range in an inverter, in which range the input voltage is between $V_{tp}$–$V_{tn}$.

A modeling procedure is described herein which provides accurate enough timing data of cell variants during design optimization that eliminates or reduces the need to create the cell variants in advance for rigorous analysis and the library development. This avoids the creation of cell libraries which have exploding numbers of entries to provide for minor modifications that could be made after placement and routing.

The concept of output short-circuit voltage $V_{SC}$ is introduced, which provides for modeling changes in delay over all slew/load scenarios encountered in practical designs.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A design optimization method for a target circuit design including cells specified by a machine-readable file, comprising:
    executing, using a computer system, for a cell having an initial form, a cell modification procedure to modify a characteristic of the cell to produce a modified cell;
    determining a characteristic of an event in cell switching behavior of the modified cell, where changes in the characteristic of the event correlate with changes in delay of the cell due to the modification procedure, wherein the event is a transition in a cell switching behavior from a first region in which one behavior dominates the cell switching to a second region in which another behavior dominates cell switching, wherein the first region is a short circuit behavioral region including competing pull-up and pull-down currents, and the second region is a current flow region dominated by one of pull-up and pull-down currents affecting an output of the cell, wherein the characteristic of the event is a value of voltage $V_{SC}$, where $V_{SC}$ is equal to an output voltage for the modified cell, and the event is a point at which an input voltage $V_{in}$ crosses outside a short circuit behavioral range, in which range of the input voltage $V_{in}$ is between thresholds for the first and second regions according to a computer-implemented model of cell switching behavior; and
    determining a value for delay of the modified cell as a function of the determined characteristic of the event.

2. The method of claim 1, wherein the cell is an inverter, and the event is a point at which an input voltage $V_{in}$ crosses from inside to outside a range between a threshold $V_{tp}$ for a pull-up transistor and a threshold $V_{tn}$ for a pull-down transistor, according to a computer-implemented model of cell switching behavior.

3. The method of claim 2, wherein $V_{SC}$ is equal to the output voltage for the cell in the modified form at the event.

4. The method of claim 1, the circuit modification procedure including identifying circuit paths in the target circuit design having available timing slack, and applying the cell modification procedure to cells in the identified circuit paths subject to constraint according to the available timing slack.

5. The method of claim 1, wherein the circuit modification procedure includes applying cell gate length adjustments constrained by delay.

6. The method of claim 1, including providing a cell library, the cell library including an entry for the cell having parameters of a delay model for the cell in an initial form, parameters of a model to estimate the characteristic of the event as a function of modifications of the initial form, and parameters of a delay change model to estimate delay change relative to delay of the initial form as a function of the characteristic; and
    wherein the machine readable file comprises data specifying the target circuit design after placement and routing using the cell library.

7. The method of claim 1, wherein the machine readable file comprises a layout file specifying the target circuit design including a plurality of cells, the layout file specifying shapes of components of the cells, placements of the plurality of cells, and interconnections among the cells, and includes a set of circuit paths.

8. A design optimization method for reducing leakage power for a target circuit design specified by a machine-readable file, comprising:
    executing, using a computer, a process for timing constrained, leakage power reduction for the target circuit achievable by applying gate length adjustments to cells in the layout;
    selecting a cell in the layout for modification;
    applying a gate length adjustment to at least one transistor in the selected cell to produce a modified cell;
    determining a characteristic of an event in cell switching behavior in the modified cell, where changes in the characteristic of the event correlate with changes in delay of the selected cell due to the gate length adjustment, wherein the event is a transition in a cell switching behavior from a first region in which one behavior dominates cell switching to a second region in which another behavior dominates cell switching, wherein the first region is a short circuit behavioral region including competing pull-up and pull-down currents, and the second region is a current flow region dominated by one of pull-up and pull-down currents affecting an output of the modified cell, wherein the characteristic of the event is a value of voltage $V_{SC}$, where $V_{SC}$ is equal to an output voltage for the modified cell, and the event is a point at which an input voltage $V_{in}$ crosses outside a short circuit behavioral range, in which range the input voltage $V_{in}$ is between thresholds for the first and second regions according to a computer-implemented model of cell switching behavior; and
    determining a value for delay of the modified cell after the gate length adjustment as a function of the characteristic of the event.

9. The method of claim 8, wherein the selected cell is an inverter, and the event is a point at which an input voltage $V_{in}$ crosses from inside to outside a range between a threshold $V_{tp}$ for a pull-up transistor and a threshold $V_{tn}$ for a pull-down transistor, according to a computer-implemented model of cell switching behavior.

10. The method of claim 9, wherein $V_{SC}$ is equal to output voltage for the selected cell after the gate length adjustment at the event.

11. The method of claim 8 wherein selecting a cell includes identifying a circuit path in the target circuit design having available timing slack, and selecting a cell in the identified circuit path; and wherein the machine readable file comprises data specifying the target circuit design after placement and routing.

12. The method of claim 8 wherein the machine readable file comprises a layout file specifying the target circuit design including a plurality of cells, the layout file specifying shapes of components of the cells, placements of the plurality of cells, and interconnections among the cells, and includes a set of circuit paths.

13. A data processing system for performing a design optimization method for a target circuit design, comprising:

a processor and memory storing a layout file specifying a target circuit design, and a computer-implemented cell library, and instructions executable by the processor; the instructions including logic to:

execute for a cell having an initial form a cell modification procedure to modify a characteristic of the cell to produce a modified cell;

determine a characteristic of an event in cell switching behavior of the modified cell, where changes in the characteristic of the event correlate with changes in delay of the cell due to the modification procedure, wherein the event is a transition in a cell switching behavior from a first region in which one behavior dominates the cell switching to a second region in which another behavior dominates cell switching, wherein the first region is a short circuit behavioral region including competing pull-up and pull-down currents, and the second region is a current flow region dominated by one of pull-up and pull-down currents affecting an output of the modified cell, wherein the characteristic of the event is a value of voltage $V_{SC}$, where $V_{SC}$ is equal to an output voltage for the modified cell, and the event is a point at which an input voltage $V_{in}$ crosses outside a short circuit behavioral range, in which range the input voltage $V_{in}$ is between thresholds for the first and second regions according to a computer-implemented model of cell switching behavior; and determine a value for delay of the modified cell as a function of the determined characteristic of the event.

14. The system of claim 13, wherein the modified cell is an inverter, and the event is a point at which an input voltage $V_{in}$ crosses from inside to outside a range between a threshold $V_{tp}$ for a pull-up transistor and a threshold $V_{tn}$ for a pull-down transistor, according to a computer-implemented model of cell switching behavior.

15. The system of claim 14, wherein $V_{SC}$ is equal to an output voltage for the modified cell at the event.

16. The system of claim 13, the circuit modification procedure including identifying circuit paths in the target circuit design having available timing slack, and applying the cell modification procedure to cells in the identified circuit paths subject to constraint according to the available timing slack.

17. The system of claim 13, wherein the circuit modification procedure includes applying cell gate length adjustments.

18. The system of claim 13, wherein memory in the data processing system stores a cell library, and the cell library includes an entry for the cell having parameters of a delay model for the cell in an initial form, parameters of a model to estimate the characteristic of the event as a function of modifications of the initial form, and parameters of a delay change model to estimate delay change relative to delay of the initial form as a function of the characteristic; and wherein the machine readable file comprises data specifying the target circuit design after placement and routing using the cell library.

19. The system of claim 13, wherein the machine readable file comprises a layout file specifying the target circuit design including a plurality of cells, the layout file specifying shapes of components of the cells, placements of the plurality of cells, and interconnections among the cells, and includes a set of circuit paths.

20. An article of manufacturing comprising:

a non-transitory machine readable data storage medium storing instructions executable by a data processor; the instructions including logic to:

execute for a cell having an initial form a cell modification procedure to modify a characteristic of the cell constrained by delay to produce a modified cell;

determine a characteristic of an event in cell switching behavior of the modified cell, where changes in the characteristic of the event correlate with changes in delay of the cell due to the modification procedure, wherein the event is a transition in a cell switching behavior from a first region in which one behavior dominates the cell switching to a second region in which another behavior dominates cell switching, wherein the first region is a short circuit behavioral region including competing pull-up and pull-down currents, and the second region is a current flow region dominated by one of pull-up and pull-down currents affecting an output of the cell, wherein the characteristic of the event is a value of voltage $V_{SC}$, where $V_{SC}$ is equal to an output voltage for the modified cell, and the event is a point at which an input voltage $V_{in}$ crosses outside a short circuit behavioral range, in which range of the input voltage $V_{in}$ is between thresholds for the first and second regions according to a computer-implemented model of cell switching behavior; and determine a value for delay of the modified cell as a function of the determined characteristic of the event.

21. The article of claim 20, wherein the cell is an inverter, and the event is a point at which an input voltage $V_{in}$ crosses from inside to outside a range between a threshold $V_{tp}$ for a pull-up transistor and a threshold $V_{tn}$ for a pull-down transistor, according to a computer-implemented model of cell switching behavior.

22. The article of claim 21, wherein $V_{SC}$ is equal to an output voltage for the cell in the modified form at the event.

23. The article of claim 20, the circuit modification procedure including identifying circuit paths in the target circuit design having available timing slack, and applying the cell modification procedure to cells in the identified circuit paths subject to constraint according to the available timing slack.

24. The article of claim 20, wherein the circuit modification procedure includes applying cell gate length adjustments constrained by delay.

25. The article of claim 20 including a cell library stored on the data storage medium, the cell library including an entry for the cell having parameters of a delay model for the cell in an initial form, parameters of a model to estimate the characteristic of the event as a function of modifications of the initial form, and parameters of a delay change model to estimate delay change relative to delay of the initial form as a function of the characteristic; and wherein the initial form of the cell is represented by data specifying a target circuit design after placement and routing using the cell library.

26. The article of claim 20, wherein the initial form of the cell is represented by machine readable file that comprises a layout file specifying the target circuit design including a plurality of cells, the layout file specifying shapes of components of the cells, placements of the plurality of cells, and interconnections among the cells, and includes a set of circuit paths.

* * * * *